Sept. 10, 1935.  A. VIGNE  2,013,872
JOURNAL BEARING
Filed Aug. 16, 1933
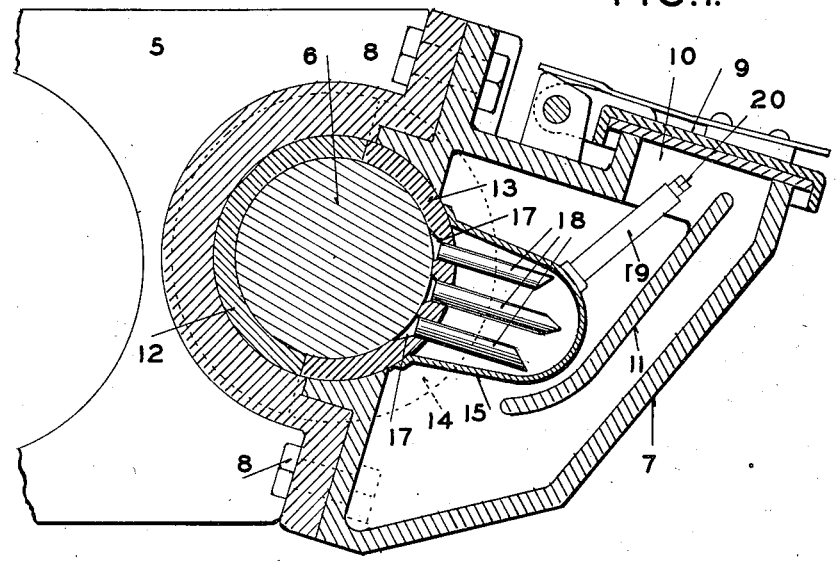
FIG.I.
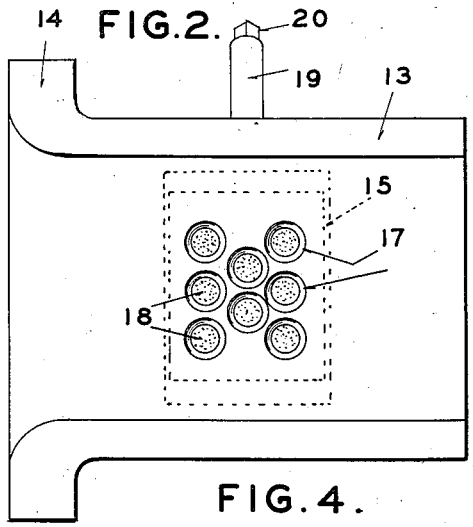
FIG.2.
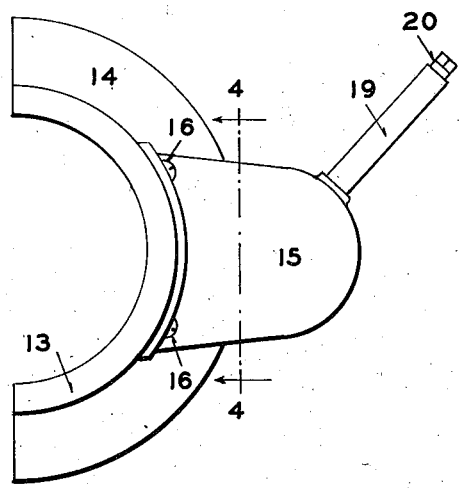
FIG.3.
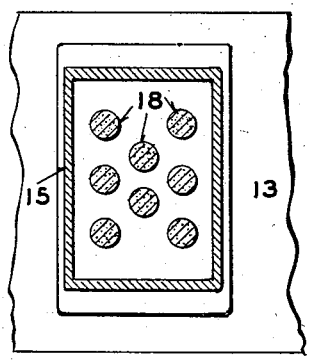
FIG.4.
Inventor
Albert Vigne
By E. E. Huffman
Att'y.

Patented Sept. 10, 1935

2,013,872

UNITED STATES PATENT OFFICE 2,013,872

JOURNAL BEARING

Albert Vigne, Webster Groves, Mo., assignor to National Bearing Metals Corporation, St. Louis, Mo., a corporation of New York Application August 16, 1933, Serial No. 685,341

1 Claim. (Cl. 308—79)

My invention relates to a journal bearing and particularly to an axle bearing for street railway cars.

One object of my invention is to provide improved means for lubricating the bearing whereby effective lubrication may be secured with the minimum use of oil, thus effecting a saving not only on the cost of the lubricant but also in the upkeep of the bearing in which the oil will require infrequent renewal.

Another object of my invention is to so construct the device that it may be readily applied to existing types of street railway car driving mechanism.

In the accompanying drawing, which illustrates one form of bearing made in accordance with my invention, Figure 1 is a vertical cross section; Figure 2 is a plan view of one-half of the brass carrying an oil receptacle; Figure 3 is an end view of the half of the brass shown in Figure 2; and Figure 4 is a section taken on the line 4—4 of Figure 3.

Referring first to Figure 1, the numeral 5 indicates a portion of the motor frame of a street railway car. This frame forms one part of the bearing for the axle 6, the other part being formed by a cap 7 secured to the frame by any suitable means, such as bolts 8. The cap is hollow and has heretofore been utilized to hold cotton waste or other absorbent material soaked with oil to furnish lubrication for the bearing. A hinged spring lid 9 covers the opening 10 through which the waste has heretofore been inserted and removed and the oil supplied. A dividing plate 11 has usually been provided to form a passage-way for the oil. All the above described parts are old and well known in the art and form no part of my invention except in combination with the lubricant applying means hereinafter described.

As is usual in bearings of this type the axle does not bear directly upon the frame and cap, which are of cast iron or steel, but upon an interposed sleeve of bearing metal termed a brass. This brass is formed of two semi-cylindrical parts 12 and 13, respectively. Each part of the brass is provided with an end flange 14.

Carried on the part 13 of the brass is a lubricant receptacle 15 which may be made integral with the brass, but, for convenience in manufacture, is preferably formed separately therefrom and attached thereto either by screws 16, as shown in Figure 3, or by brazing or welding. The interior of the bearing communicates with the lubricant receptacle through a number of openings 17, in each of which is secured a stem 18 of capillary material. These stems are preferably made of sections of rattan having the cortex removed so as to be pervious to the oil, not only at their ends but throughout their entire surface. As is best shown in Figure 1, these stems do not come in contact with the axle but terminate at a short distance therefrom, thus avoiding glazing of the ends of the stems which would interfere with the proper transfer of oil. A tube 19 is carried by the oil receptacle and terminates adjacent the lid 9 so that the receptacle may be filled through this lid without removal from the bearing. The end of the tube is normally closed by a plug 20.

By the use of my improved form of bearing an adequate supply of lubricant for the axle is insured and at the same time application of an excessive amount of oil is avoided so that the bearing will run for a long period of time without attention.

Having fully described my invention, what I claim as new and desire to secure by Letters Patent of the United States is:

In a device of the class described, the combination with a motor frame, of a hollow cap secured thereto and forming therewith an axle bearing space, said cap having a lateral opening communicating with the bearing space and a top opening provided with a movable cover, a sleeve of bearing metal in the bearing space, an axle in the sleeve, a lubricant receptacle carried by the sleeve and projecting laterally from the first named opening into the cap, and a filling tube carried by the receptacle and extending upwardly to a point adjacent the second named opening.

ALBERT VIGNE.